United States Patent [19] [11] Patent Number: 4,969,930
Arpalahti [45] Date of Patent: Nov. 13, 1990

[54] PROCESS FOR GASIFYING OR COMBUSTING SOLID CARBONACEOUS MATERIAL

[75] Inventor: Olli E. Arpalahti, Varkaus, Finland

[73] Assignee: A. Ahlstrom Corporation, Noormarkku, Finland

[21] Appl. No.: 476,045

[22] Filed: Feb. 8, 1990

[30] Foreign Application Priority Data

Feb. 22, 1989 [FI] Finland .................................. 890833

[51] Int. Cl.$^5$ ............................................... C10J 3/54
[52] U.S. Cl. ...................................... 48/197 R; 48/203; 48/206; 48/210; 110/347; 122/4 D
[58] Field of Search ...................... 48/197 R, 206, 210, 48/209 DIG. 4, 202, 203; 252/373; 110/347; 122/4 D

[56] References Cited

U.S. PATENT DOCUMENTS

| 3,847,566 | 11/1974 | Wilson | 48/202 |
| 4,315,758 | 2/1982 | Patel et al. | 48/197 R |
| 4,400,181 | 8/1983 | Snell et al. | 48/197 R |
| 4,684,375 | 8/1987 | Merin et al. | 48/DIG. 4 |
| 4,696,678 | 9/1987 | Kayama et al. | 48/206 |
| 4,709,662 | 12/1987 | Rawdon | 122/4 D |
| 4,721,514 | 1/1988 | Kikudo et al. | 48/206 |
| 4,823,739 | 4/1989 | Marcellin | 122/4 D |
| 4,896,717 | 1/1990 | Campbell | 122/4 D |
| 4,929,255 | 5/1990 | Hakulin et al. | 48/197 R |

FOREIGN PATENT DOCUMENTS 2065162 6/1981 United Kingdom.

Primary Examiner—Peter Kratz
Attorney, Agent, or Firm—Nixon & Vanderhye

[57] ABSTRACT

An apparatus for gasifying solid carbonaceous material in a circulating fluidized bed reactor. Particles are separated from the product gas at least in two stages so that in the first stage mainly coarser, so-called circulating particles are separated and returned to the reactor. In the second stage fine carbonaceous and ash-containing particulates are separated from the gas and are made to agglomerate at a raised temperature. Coarser particles thus received are returned to the reactor through a return duct together with circulating particles. Agglomeration is effected in a chamber where a fluidized bed composed of coarse particles is maintained. Fine particulate material and oxygen containing gas are introduced into the free upper part of the chamber so as to form a hot flame (e.g. 1200° C.). The point of the flame penetrates into the fluidized bed. The ash material contained in the fine particulate material melts, and is conducted to the bubbling fluidized bed.

8 Claims, 3 Drawing Sheets

PROCESS FOR GASIFYING OR COMBUSTING SOLID CARBONACEOUS MATERIAL

BACKGROUND AND SUMMARY OF THE INVENTION

The present invention relates to an apparatus for gasifying or combusting solid, carbonaceous material in a circulating fluidized bed reactor. The circulating fluidized bed reactor comprises a separator which is disposed after the reaction chamber and which separates circulating bed material from gas. The separator for circulating material is provided with a gas outlet for discharging gas from said separator and with a duct for returning separated particles preferably to the lower part of the reaction chamber. A separator for fine particulates is also disposed in the gas flow from the separator.

In a circulating fluidized bed reactor, where the flow rate of gas is maintained at such a high level that a considerable portion of solid particles is discharged with gas from the reaction chamber and, after separation of particles, the major part of the solid particles is returned to the fluidized bed, the gasification or combustion of solid carbonaceous material has been recognized to have several advantages over conventional gasification or combustion methods.

Several different methods have been applied in the gasification of solid, carbonaceous fuel, the most important of them being gasifiers based on the fluidized bed concept as described above. The problem with all gasifiers, including (although to a lesser extent) fluidized bed gasifiers, is how to achieve a very high carbon conversion. This problem becomes more acute when fuels with low reactivity, such as coal, are to be gasified. It is also difficult to achieve a high carbon conversion with fuels having a small particle size, such as milled peat.

Poor carbon conversion is principally the result of the comparatively low reaction temperature of fluidized bed gasifiers, which is restricted by the melting temperature of the fuel ashes. Carbon conversion can be significantly improved by increasing the reaction time of the gasification, i.e., by returning the escaped, unreacted fuel to the reactor.

In a circulating fluidized bed gasifier or boiler, the rate of flow of the upwardly directed gas is so high that a substantial amount of solid bed material, entrained with product or flue gases, passes out of the reactor. Most of such outflowing bed material is separated from the gas by separators and returned to the reactor. The finest fraction, however, is discharged with the gas. Circulating material in the reactor comprises ashes, coke and other solid material, such as limestone, possibly introduced in the gasifier, which induces desired reactions such as sulfur capture.

However, separators such as cyclones, which are normally used, have a restricted capacity for separating small particles. Normally, hot cyclones can separate only particles up to the size of 50–100 microns, and finer fractions tend to escape with the gases. Since the unreacted fuel discharged from the reactor with the gas is mainly coke, from which the volatile (reactive) parts have already been discharged, it would, when returned to the reactor, require a longer retention time than the actual "fresh" fuel. However, because the grain size of the returned coke is very small, the returned fine fraction is immediately discharged again from the reaction chamber, and thus the reaction time remains too short and the carbon conversion undesirable low.

The grain size of the coke gradually becomes less during the process, thereby increasing the emission of particulate material from the cyclone, which results in a low carbon conversion.

Even though small coke particles can be separated from the gases with new ceramic filters, additional problems arise. Solid fuels always contain ashes which have to be removed from the system when pure gas is produced. When aiming at a carbon conversion as high as possible, ashes have to be removed so as to avoid discharging large amounts of unreacted carbon with the ashes. The particle size of the ashes, however, always varies within a wide range and fine ashes tend to fly out of the reactor with the fine coke residue.

In order to achieve a high carbon conversion, the following diverse criteria must be reconciled: (1) separation of fine particulates from the gases and return of such to the reactor must be possible, and (2) the carbon contained in the returned particulates has to be made to react, and the ashes have to be separated from the system.

Until now, attempts to reconcile these criteria have been unsuccessful.

It is also common in boiler plants, at fluidizing bed combustion, that unburned coal is easily entrained with the fly ash, especially if poorly reactive fuel is employed or if the boiler plant is under a low load or under an extremely heavy load. Fly ash may contain over 10% coal, sometimes even 20%, which lowers the efficiency of the boiler. It is known that returning the fly ash to the combustion chamber gives a lower carbon content in the fly ash, thus improving the efficiency of the boiler.

Fly ash itself is a problematic produce, however. For example, in the U.S.A., only 20% of the total amount of fly ash can be utilized in the building industry and construction of roads. Final storing causes problems to the power plants. Fly ash is a low density material which means that the residual fly ash requires quite a large storage area. This constitutes a problem in densely populated areas. Furthermore, one has to pay attention to storing of the ashes in such a manner that they do not come into contact with groundwater. Ammonia has recently been introduced into the purification of flue gases, and this has added to the fly ash problem. The fly ash treated with ammonia cannot be used in the concrete industry.

The combustion temperatures in the fluidized bed boilers are substantially lower than, for example, in pulverized combustors and the ash properties are quite different. Ashes produced by combustion at lower temperatures are not stable, but depending on the conditions, there may be gaseous, liquid or dusty emissions.

U.S. Pat. No. 4,315,758 discloses a method and apparatus for solving the problem with the fines recycling. According to this method, the finest particulates separated from the gas are conducted back to the lower part of the reactor while oxygen containing gas is introduced into the same place in the reactor, thereby forming a high temperature zone in which the recovered fine particulates agglomerate with the particles in the fluidized bed. This method introduces an improvement in the so-called "U-gas Process" method.

British Patent No. GB 2,065,162 discloses a method and apparatus for feeding the fine material separated from gas to the upper part of the fluidized bed in which the fine particulates agglomerate with particles of the fluidized bed when oxygen containing gas is conducted to the same place in the reactor.

The problem with both of these methods is process control. Both methods aim at agglomeration of the separated fine material to the fluidized bed (featuring excellent heat and material transfer properties). It is of major importance that the main process itself can operate at an optimal temperature, and it is easily disturbed when the temperature needed for the agglomeration is not the same as that needed for the main process. Due to the good heat transfer that occurs in the fluidized bed, the temperatures tend to become balanced, which causes new problems. Gas different from the oxygen containing gas used in the actual gasification is needed because of the excess heat. Additionally, because the size of particles contained in the fluidized bed varies considerably, it is difficult to control the agglomeration in the reactor so that production of ash agglomerates of too large a size could be prevented. Ashes stick to large as well as small bed particles and ash agglomerates of too large a size are easily formed, which impede or prevent ash removal, and the gasifying process has consequently to be interrupted. Furthermore, agglomeration in the reactor itself causes local overheating, which in turn leads to abrasion of brickwork.

U.S. Pat. No. 3,847,566 discloses one solution in which high carbon conversion is sought by burning the fine material escaping from the gasifier in a separate combustion device. Coarser, carbonaceous material taken from the fluidized bed is heated with the heat released from combustion. This carbonaceous material is returned to the fluidized bed after the heating. This is how the heat required for the gasification is generated. The gases, flue gas and product gas, released from the combustion and gasification have to be removed from the system in two separate processes both including a separate gas purification system. As can be seen, the arrangement of this method requires quite complicated constructions and results in poorly controlled processes.

The problem with the above-mentioned methods resides in the difficult process conditions where agglomeration conditions have to be controlled. This calls for expensive materials and cooled constructions.

According to the invention, an apparatus for gasification or combustion, by means of which the highest possible carbon conversion is attained without the above-mentioned drawbacks in the process control and without complicated and expensive constructions, is provided. According to the invention, it is also possible to separate the finest carbonaceous particulates from the product or flue gas and return them to the reactor in such a form that the carbon contained in the particulates can be exploited and the ash be separated.

According to the invention, in a circulating fluidized bed reactor, agglomerating means are provided comprising an agglomerating and fluidizing chamber disposed in connection with the return duct for particles. The agglomerating chamber is in communication with a return duct for circulating particles discharged from the separator and with the lower part of the return duct, through which circulating particles are returned to the lower part of the fluidized bed reactor. The bottom of the chamber is provided with means (such as fluidizing gas nozzles) for feeding fluidizing gas to maintain a bubbling fluidized bed in the chamber. The bed material is comprised of circulating particles. The fluidizing gas can also be introduced into the reactor, for example, through a porous bottom plate.

The upper part of the agglomerating chamber is provided with a burner for particulates for heating and for at least partially combusting fine particulates. Fine particulates from the separator therefor are conducted through the burner to the free space above the fluidized bed in the chamber. The burner for particulates comprises two conduits or nozzles, one for oxygen containing gas, the other for fine particulates or for a mixture of particulates and gas. The burner for particulates is disposed in the upper part of the agglomerating chamber so as to form a flame, produced in the combustion of particulates, substantially in the space above the fluidized bed. Therefore, the nozzle for particulates and the nozzle for gas are preferably so disposed as to make the point of the flame of combusting particulates penetrate the bubbling fluidized bed.

In the apparatus according to the invention, fine particulates separated in the gas purification stage are agglomerated with the circulating bed material at a raised temperature before the solid particles are returned to the reaction chamber. Thus, particles are separated from the gas at least in two stages. In the first stage, mainly coarser particles are separated, the major part of which is returned to the reactor as circulating material. In the second stage, mainly finer carbonaceous particulates are separated, at least a portion of which, agglomerated and mixed with the circulating material, is returned to the fluidized bed reactor at a raised temperature.

The temperature of the separated fine particulates is raised to over 1000° C., preferably to 1000°-1300° C., by conducting oxygen containing gas into the flow of particulates, whereupon at least part of the fine particulates form or become sticky particles which are caused to agglomerate with the circulating particles before they are returned to the reactor chamber. Preferably, agglomerated particles are caused to mix evenly with the circulating particles before they are returned to the reactor.

In such processes where the higher the temperature for purification of the gas the better, fine particulates can also be separated from the product gas by employing several consecutively connected cyclones, cyclone radiators or high-heat filters or other equivalent means which are also capable of separating fine particulates.

On the other hand, for example, connected with a combined power plant, it is advantageous to use the hot product gas for superheating steam and not to separate the fine particulates from the product gas until the gas has cooled to a lower temperature, such as 850° C. In this case, the purification of the gas is also easier to accomplish. At a lower temperature, the gas does not include to a harmful extent fine fumes which are difficult to separate and which easily clog, for example, pores of ceramic filters. Furthermore, hot fumes are extremely aggressive chemically and impose great demands on materials. The method according to the present invention is, therefore, most suitable for combined power plant applications because the carbon conversion of the fuel is high, the product gas is pure and well applicable to gas turbines and, furthermore, the overall heat economy is improved by superheating the steam.

Agglomeration increases the particle size of fine particulates to such an extent that the retention time of the particulates becomes longer in the reactor and the carbon conversion is improved. If the particle size of the returned particulates is increased sufficiently, the ash particles can be removed from the reactor at an optimal stage, whereby the carbon contained in ash particles has reacted almost completely.

By agglomerating the particulates outside the actual fluidized bed reactor, where the coarsest circulating particles are considerably smaller in size than the coarsest fluidizing particles in the reactor itself, formation of particles of too large a size is avoided, which particles might be discharged from the reactor along with the ashes thereby leaving the carbon insufficient time to react completely.

Gasification in a circulating fluidized bed reactor is in some ways different from gasification in a conventional bubbling fluidized bed reactor. In a circulating fluidized bed reactor, the upwardly directed flow rate is so high, typically 2–10 m/s, that a large amount of solid bed material is entrained with the gases to the upper part of the reactor, and some passes out of the reactor, where it is returned after the gas separation. In such a reactor, the important reactions between the gases and solid material are effected over the entire area of the reactor while the suspension density is even in the upper part of the reactor 0.5–30 kg/kg of gas, most commonly 2–10 kg/kg of gas.

In a bubbling fluidized bed, where the flow rate of the gas is typically 0.4–2 m/s and the suspension densities in the upper part of the reactor about 10 to 100 times lower than in the circulating fluidized bed reactor, the gas/solid material reactions are mainly effected in the lower part of the reactor, i.e., in the bed.

The invention provides, for example, the following advantages:

A high degree of carbon conversion is achieved.

Agglomeration of fine carbon can be effected in a controlled manner not disturbing the process conditions in the gasifier or boiler.

With a circulating fluidized bed concept, the cross section of the reactor can be clearly smaller than with a so-called bubbling fluidized bed reactor.

Thanks to the smaller cross section and better mixing conditions, there is an essential decrease in the need for fuel feed and ash removal devices in comparison with the so-called bubbling bed.

Capture of sulfur contained in the fuel with inexpensive lime can be effected in the process.

Reactions between solids and gases take place over the entire area of the reactor section and separator.

The equipment described above does not require expensive special materials.

As the various stages of the process are performed in various devices, the process control can be carried out optimally with regard to the total result.

Inert ashes are received; and

Problems with storing fly ash are reduced.

BRIEF DESCRIPTION OF THE DRAWINGS

The invention will be further described below, by way of example, with reference to the accompanying drawings, in which two embodiments of the present invention are illustrated as follows.

DETAILED DESCRIPTION OF THE DRAWINGS

Figure 1:
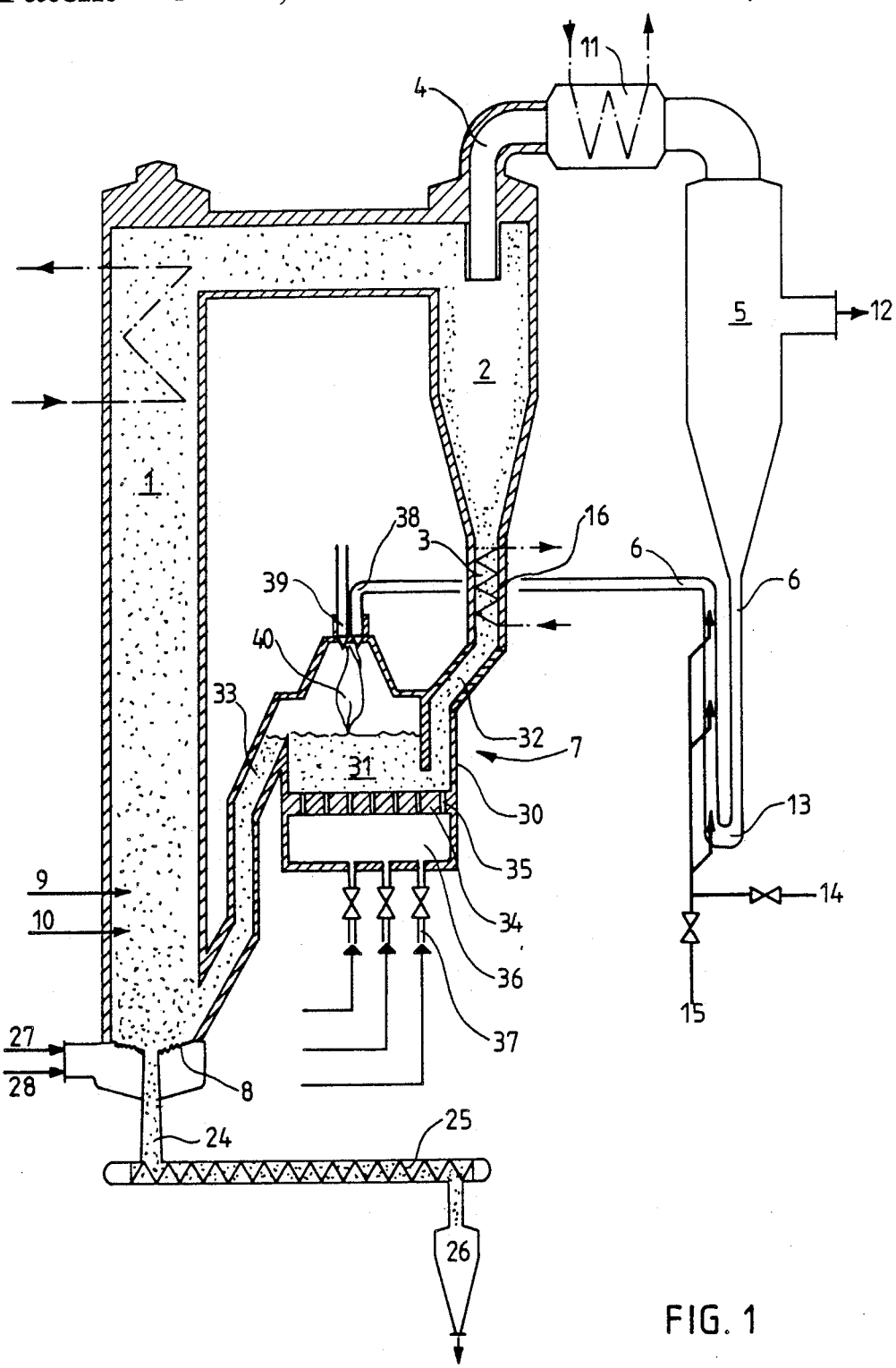
FIG. 1 is a schematic illustration of an exemplary gasifier according to the invention.

In the gasifier shown in FIG. 1, the upper part of a fluidized bed reactor 1 is connected to a particle separator 2, the lower part of which is provided with a return duct 3 which conducts circulating particles to the lower part of the reactor 1. The product gas is discharged from the upper part of the separator 2 through a discharge duct 4 to a separator 5 for removing fine particulates. The separator 5 for fine particulates is provided with a duct 6 which leads fine particulates to an agglomerating means 7, which is disposed connected to the return duct 3 for circulating particles. The bottom of the fluidized bed reactor 1 is provided with a distributor 8 for fluidizing gas. Carbonaceous solid material to be gasified is introduced into the reactor 1 through a conduit 9 and lime or other material for separating sulfur contained in the material to be gasified through a conduit 10.

In accordance with the present invention, the major part of the solids issuing from the reactor 1 and comprising unreacted carbon and solid material, such as lime and ashes contained in the fuel (possibly fed into the reactor through conduit 10) is separated from the gas in the separator 2. However, the finest fraction, the ratio of which is typically 0.1–2% of the solids flowing from the reactor, passes with the product gas flow discharged from the reactor 1. The separator 2 may be of some known type, such as a cyclone separator with refractory lining or some other equivalent hot gas separator.

A high temperature of 750° to 1100° C. typically prevails in the reactor 1 and separator 2. The reactor 1 and separator 2 are preferably internally lined with refractory. Hot gases together with the small amount of fine particulates contained therein may be led through duct 4 to a heat recovery unit 11, if required, which unit 11 also cools the gases to some extent.

Subsequent to the heat recovery unit 11, the gases are led to a further separator 5 for fine particulates, where practically all solids are separated from the gases. The separator 5 may be of known type, such as a ceramic or other filter, or a centrifugal separator with a high separating capacity. Pure gas passes through duct 12 to the point of use. Fine particulates, which have been separated from the gas in separator 5, pass through duct 6 to the sealing and agglomerating means 7. When the fine particulate material, having been separated in the separator 5 and containing carbon dust, is hot, it is preferable to use a loop seal 13 in order to feed particulates to the agglomerating means 7 by using oxygen containing gas fed in through a duct 14. This causes partial oxidation of the particulates conveyed in the duct 6, thus raising the temperature of the particulates. If the particulates tend to become over-heated, it is possible to also feed other gas through a duct 15. Preferred other gases are aqueous steam and carbon dioxide. If necessary, conveyance of particulates can be effected by an inert gas only.

A great mass flow of solids coming from the separator 2 and passing through the duct 3 to the lower part of the sealing and agglomerating device 7 may, if necessary, be cooled by a cooler 16 disposed in the duct 3, thus also recovering heat. A circulating flow of coarse particles shall be cooled if the flow of fine particulates to be heated is great in proportion to the circulating particle flow, thus having a heating effect on the reactor. Usually, the flow of fine particulate material is very small in proportion to the circulating particle flow, thus having no effect on the temperature of the reactor.

Figure 2:
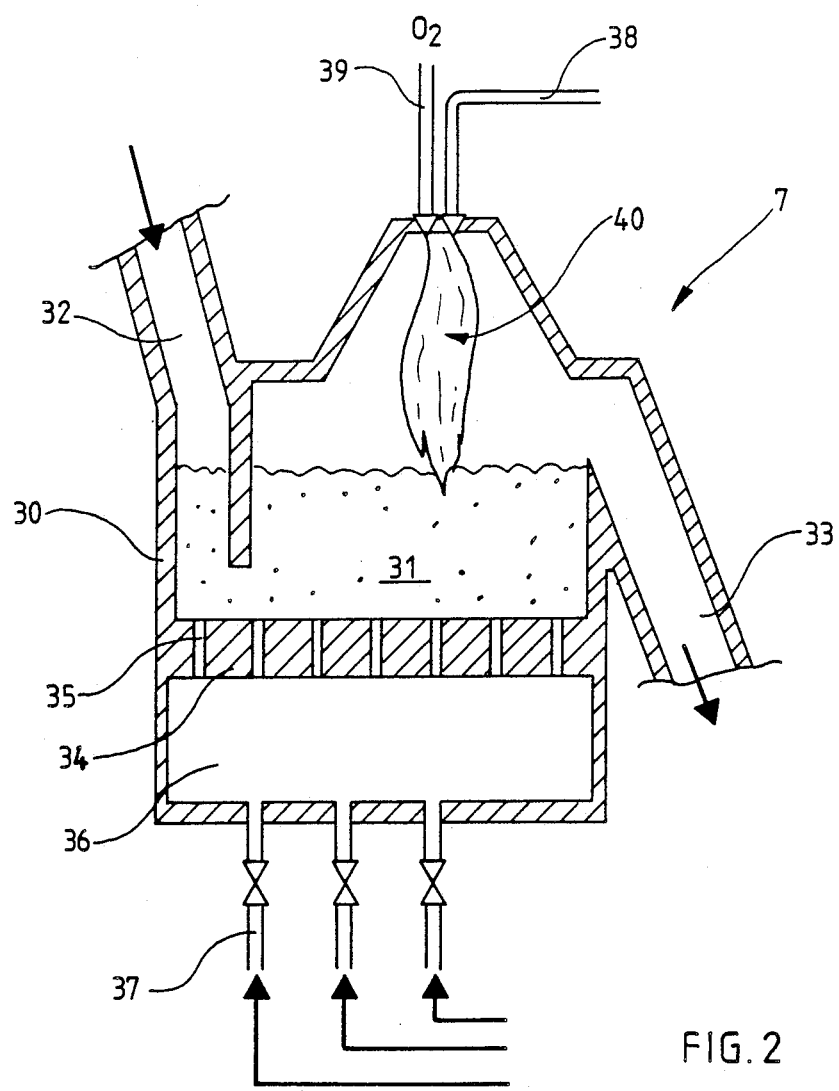
FIG. 2 is a schematic illustration of a sealing and agglomerating device utilizable in the gasifier of FIG. 1.

The agglomerating means 7 illustrated in FIG. 2 comprises an agglomerating and fluidizing chamber 30 where a fluidized bed 31, which is preferably bubbling, is maintained. The bed material of the fluidized bed is mainly comprised of circulating particles, which are separated from the process gas in the separator 2 and are further conducted to the upper part of the return duct 3 and through the inlet 32 to the agglomerating chamber. Bed material is continuously removed through the outlet duct 33 from the agglomerating chamber 30 and returned to the fluidized bed reactor 1 through the lower part of the duct 33. The bottom of the chamber 30 is formed of a grid plate 34 provided with nozzles 35 for feeding fluidizing gas from the distribution chamber 36 below the grid to the agglomerating chamber. The fluidizing gas is preferably conducted through adjustable inlets 37 to the distribution chamber. A suitable fluidizing gas for the particle flow from the inlet 32 is either inert gas, such as nitrogen, aqueous steam and/or carbon dioxide, or oxygen gas or a combination of oxygen and inert gas.

The upper part of the agglomerating chamber 30 is provided with a nozzle 38 for fine particulates and a nozzle 39 for the gas maintaining combustion. Thereby, a hot (>1200° C.) flame 40 is formed in the upper part of the chamber, in which flame the ashes entrained with fine particulates are melted and ash particles partly stick to each other. The point of the flame 40 for combusting particulates, which flame is formed in the nozzles, penetrates into the fluidized bed. The inlet 32 and outlet 33 of the agglomerating chamber can be constructed so as to maintain a certain height of the fluidized bed in the chamber and to leave a free space for the flame of particulates in the upper part of the chamber, above the fluidized bed. The length of the flame can be adjusted by nozzles 38 and 39.

The fine residual coke to be combusted and having been discharged from the separator 5 of fine particulates and, fine ash material entrained with the fine residual coke, which ash material is to be agglomerated, are combusted in the flame 40 in the agglomerating means 7. The point of the flame 40 penetrates into the fluidized bed 31 (see FIG. 2). Thus, the fine ash material, now in a molten state as a result of combustion of coke in the hot flame 40, enters the fluidized bed where the molten particles adhere and solidify to the surface of the circulating fluidized material because the circulating material is colder than molten ashes. In the agglomerating means 7, the circulating material is therefore preferably maintained at a lower temperature than the solidification temperature of ashes.

In the main apparatus, i.e., the circulating fluidized bed reactor 1, the material to be fluidized changes all the time. Thus, also the fluidized bed material in the agglomerating means 7 continuously changes and circulating mass flow returning to the main apparatus continuously recycles agglomerated ash material to the main apparatus. In the agglomerating means, the temperature is to a great extent regulated automatically by the circulating mass flow. Since the flow of particulates discharged from the separator 5 is generally substantially smaller than the flow of particles from the separator 2, it is possible to arrange the agglomeration of fine particulates into the main flow of particles in a controlled manner without impeding the main process itself taking place in the reactor 1. When entering the reactor 1, the flows of fine particulates and other particles have mixed in the duct 33 and the temperatures have become balanced. Since the particle size of the particles discharged from the separator 2 is known (typically, 99% less than 1 mm), as well as the size of the particulates discharged from the separator 5 (typically 99% less than 0.1 mm), it is easy to control the agglomeration so as to form bigger particles of the size less than 10 mm.

The material from the duct 33 enters the reactor 1, above the distributor 8 of the fluidizing gas, said distributor being disposed at the bottom of the reactor 1 in an oxygenous atmosphere. Here, the poorly reactive agglomerated coke particles reach, due to their increased particle size, a sufficient retention time in order to react completely, whereby the material being discharged through ash discharge duct 24 contains a very small amount of unreacted carbon. Ash removal from the reactor is controlled by a control means 25, which may be, for example, a screw conveyor and the ashes are taken to an ash treating means 26, which may be of conventional type.

The oxygen containing gas is led through a duct 27 underneath the distributor 8 of the fluidizing gas, which distributes the gas to the reactor. Besides oxygen gas, it is preferable to feed aqueous steam as a fluidizing gas through a duct 28, especially when gasifying coal.

The solid material to be gasified is fed into the reactor through the conduit 9 preferably so that the feeding point is disposed above a denser fluidizing layer at the bottom of the reactor 1 where the volatilizing substances of the fuel are partly released, thus producing gas with a high caloric value. Solid material is preferably fed to a level between 2 and 4 m above the distributor of oxygen containing gas to be fed into the reactor 1.

Figure 3:
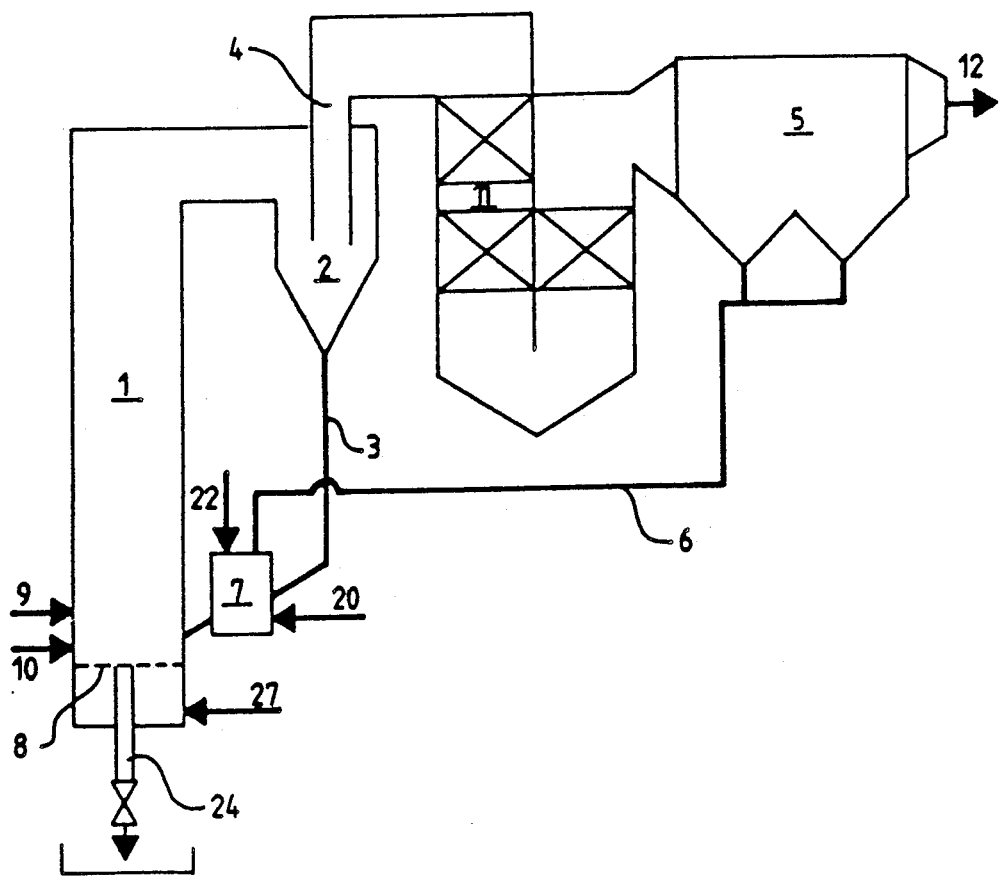
FIG. 3 is a schematic illustration of a boiler plant employing the teachings of the invention.

In the boiler plant shown in FIG. 3, the application is applied to treatment of fly ash in a circulating fluidized bed boiler employing fossil fuels. The fluidized bed boiler 1 is connected with a particle separator 2 and a return duct 3 for circulating material. The gas purified of circulating particles is led through a conduit 4 to a convection part 11 and further to a gas purifying means 5 which may be, for example, an electric filter, bag filter, ceramic filter, multi-cyclone or some other equivalent separator for fine particulate material.

Fine particulates are conveyed from the gas purifying means 5 through a duct 6 to an agglomerating means 7 disposed in the return duct 3 for the circulating particles. The agglomerating means 7 operates as described above. The temperature is raised preferably to about 1000°–1250° C. by means of oxygen containing gas, preferably air, from duct 22, at which temperature at least part of the fly ash melts and adheres to the circulating particles. The agglomerating means may be supplied with extra fuel if the carbon content of the fine particulates is insufficient for raising the temperature to a desired level. The extra fuel may be fuel to be combusted in the boiler. In some applications, all fuel may be introduced into the boiler through the agglomerating means 7 and the temperature in the agglomerating means be regulated by the amount and purity of the oxygen containing gas.

Because the volume of fine particulates is essentially smaller than the volume of circulating particles, and because generally the temperature of only fine particulates may be raised in the agglomerating means 7, a controlled recycling of particulates is possible without impeding the actual combustion process. Agglomeration of the fine particulates to the circulating particles outside the boiler facilitates the choice of the agglomerating temperature in accordance with the ashes, without harmful effects on the process in the boiler, whereas the temperature of the boiler can rarely be adjusted to suit the agglomeration to be effected in the boiler itself without impeding the combustion process.

When being mixed with cooler circulating particles, molten fly ash solidifies and forms hard and dense particles coarser than the circulating particles, typically 2 to 20 mm in size. Coarse ash particles thus received are passed along with the recirculation to the combustion chamber of the boiler, wherefrom they can be separated and discharged together with normal settled ashes through ash discharge duct 24.

In some applications, it is preferable to pressurize the circulating fluidized bed reactor under a gas pressure of 1 to 50 bar, whereby a reactor small in size is capable of producing gas suitable for, for example, combined power plant processes.

The invention is not intended to be limited to the gasifier or boiler plant described in the above examples. In some applications, it may be preferable to provide the reactor with several particle separators disposed either adjacently or in series and dispose an agglomerating means in only one or in all return ducts. The fine particulates can also be separated in several separators, which may be of different types. It is possible to agglomerate fine particulates separately from the return duct 3 and mix only the circulating particles and agglomerated particulates in the return duct. The lower part of the return duct 3 can also be provided with heat recovery equipment. Adhesion of agglomerating particles to the walls of the return duct can be prevented by leading gas flows along the duct walls so as to cool the particles before they touch the walls.

The invention is naturally also applicable to such gasifying reactors that do not employ oxygen gas to bring about gasification but rather the temperature of the fuel is raised in some other way.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for gasifying or combusting solid carbonaceous material, utilizing a circulating fluidized bed reactor having a gas discharge, and an agglomerating chamber operatively connected to the gas discharge, comprising the steps of:
   (a) separating coarse particles from gas in the gas discharge from the reactor, while passing the gas downstream from the reactor;
   (b) after step (a), separating fine particles from the gas passing downstream;
   (c) at least partially combusting the fine particles separated in step (b) and combining them, or ash produced from the combustion thereof, with the coarse particles separated in step (a), by forming a bubbling fluidized bed in a lower part of the agglomerating chamber, and combusting the fine particles primarily above the bubbling fluidized bed; and
   (d) returning the combined particles from step (c) to a lower part of the reactor.

2. A method as recited in claim 1, wherein step (c) is practiced by forming a flame in the agglomerating chamber adjacent the top thereof, the flame extending downwardly to a point that is disposed in the bubbling fluidized bed.

3. A method as recited in claim 2, wherein step (c) is further practiced by forming the flame by introducing oxygen containing gas and fine particulates into close proximity with each other adjacent the top of the agglomerating chamber.

4. A method as recited in claim 3, comprising the further step of cooling the separated coarse particles before feeding them to the agglomerating chamber.

5. A method as recited in claim 3, comprising the further step of recovering heat from the flowing gas between steps (a) and (b).

6. A method as recited in claim 1, comprising the further step of recovering heat from the flowing gas between steps (a) and (b).

7. A method as recited in claim 1, comprising the further step of cooling the separated coarse particles before feeding them to the agglomerating chamber.

8. A method as recited in claim 2 wherein step (c) is further practiced by forming a flame at a temperature of greater than about 1200° C.

* * * * *